INVENTORS
GEORGE H. McFADDEN
ROBERT E. BOYD
BAILEY BENNETT their ATTORNEYS

INVENTORS
GEORGE H. McFADDEN
ROBERT E. BOYD
BAILEY BENNETT their ATTORNEYS

United States Patent Office 2,731,427
Patented Jan. 17, 1956

2,731,427

MANUFACTURE OF RUBBER GOODS FROM A LATEX CONTAINING A FLUOTITANATE AND A FLUORIDE

George H. McFadden, Worthington, Bailey Bennett, Columbus, and Robert E. Boyd, Lima, Ohio, assignors to General Motors Corporation, Detroit, Mich., a corporation of Delaware Application October 11, 1952, Serial No. 314,264

10 Claims. (Cl. 260—2.5)

This invention relates to the manufacture of rubber-like materials and is particularly concerned with the manufacture of goods directly from rubber-like material in the latex stage.

This application is a continuation-in-part of copending application, Serial No. 131,059, filed December 3, 1949, now abandoned.

It is the basic object of this invention to provide a method for improving the production of goods made directly from latex.

In carrying out the above object, it is a further object to provide a method for eliminating local coagulation in the latex wherein a delayed coagulant, taken from the class consisting of sodium and potassium fluotitanate, has been added, such a delayed coagulant being claimed in Patent No. 2,472,054 assigned to the assignee of the present invention.

In order to accomplish the above object, it is a still further object to add sodium, potassium or ammonium fluoride or other suitable soluble alkali or alkaline earth fluoride in specific amounts to the delayed coagulant, such as sodium or potassium salts of fluotitanic acid to be subsequently used in a latex.

Figure 1:
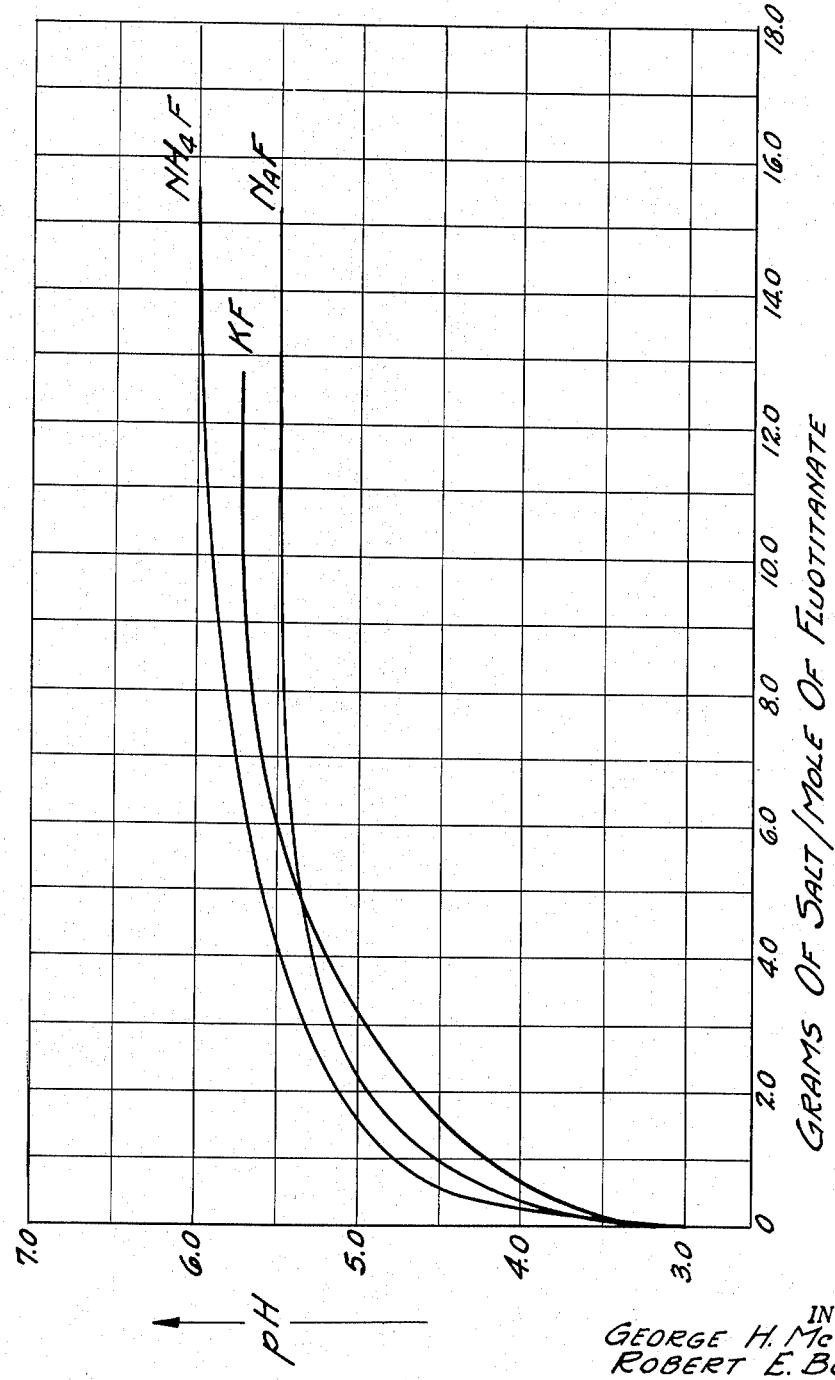
Figure 2:
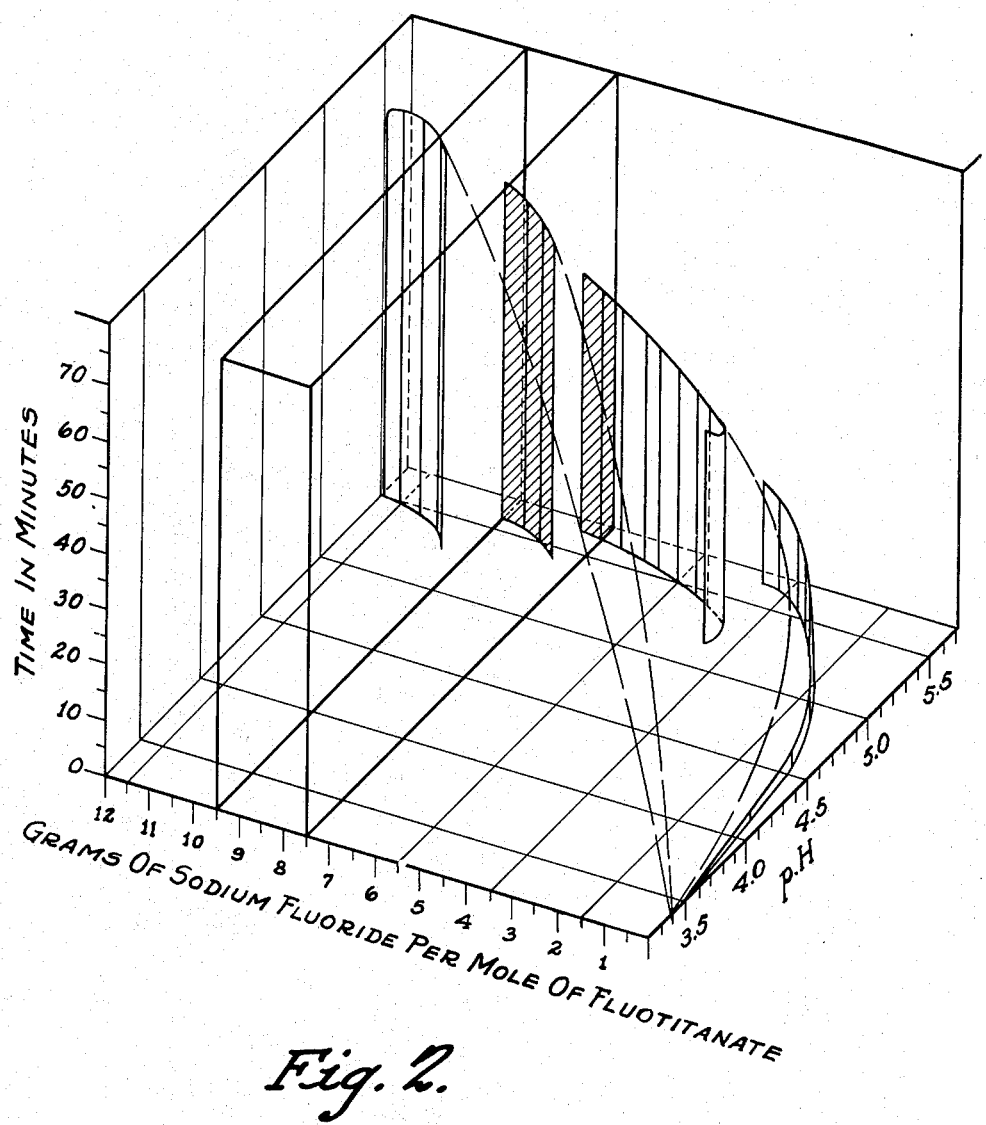

Further objects and advantages of the present invention will be apparent from the following description, reference being had to the accompanying drawing, wherein Fig. 1 is a chart showing the pH with relation to the grams of various fluorides used per mole of sodium or potassium fluotitanate; and Fig. 2 is a three-dimensional chart embodying the material shown in Fig. 1, with respect to time and specifically directed to sodium fluoride in connection with sodium fluotitanate.

In the manufacture of rubber articles directly from latex, it has been past practice to compound the latex wherein the compounding ingredients are added prior to the addition of a delayed coagulant. This delayed coagulant reacts after a predetermined time delay to coagulate the latex whereupon the material may be cured by conventional means to form a desired rubber-like article. In Patent No. 2,472,054, the soluble alkali and alkaline earth salts of fluotitanic acid are used as a delayed coagulant in specific quantities noted therein whereby coagulation or gelation of the latex may be caused within a desired and controlled period of time. This time period is important in dipping or spraying operations since the latex must be sufficiently fluid to permit handling prior to the coagulation or gelation thereof and due to manufacturing procedures must be maintained in a fluid state over an extended predetermined period of time. This is especially important when the latex has been foamed, for example, in continuous foaming apparatus or from a batch type foaming apparatus without premature coagulation thereof so that molding operations may be facilitated and a uniform product may be obtained.

It is understood that the delayed coagulant, such as the soluble alkali or alkaline earth metal salts of fluotitanic acids which also includes the ammonium salt thereof, may be used in connection with any type of latex or mixtures of latices as set forth in the aforementioned Patent No. 2,472,054, for example, any latex or aqueous dispersion of rubbery polymers of butadiene containing hydrocarbons and aqueous dispersions of polyhaloprenes.

In most latex compounding operations, some difficulty is experienced with local coagulation which is of a premature character and which, if permitted to occur, destroys the uniformity of the product and in many cases causes considerable difficulty during the manufacture of rubber goods.

This invention is directed particularly to chemical additions to the latex which eliminate or substantially eliminate local coagulation within the latex. We have found that by increasing the fluoride anion concentration, that the gelling time of the latex is not appreciably changed when using fluotitanic acid salts as a delayed coagulant and that the possibility of local coagulation of a premature character is substantially eliminated. We have further found that the fluoride salts of sodium, potassium and ammonium together with other suitable soluble alkali fluorides when added in specific quantities together with sodium or potassium fluotitanate (the delayed coagulant) create a fluoride anion concentration sufficient to prevent the difficulties heretofore mentioned.

Specifically, we have found that a defined quantity of a fluoride salt is required to be added to the latex in order to control the condition. The limits for this addition of fluoride which creates the desired condition within the foam is 7.5 grams of the fluoride salt per mole of the sodium or potassium fluotitanate as a minimum quantity, and 9.5 grams of the fluoride salt per mole of sodium or potassium fluotitanate as a maximum quantity of the addition agent. Thus when the concentration of the fluoride salt is between 7.5 and 9.5 grams per mole of the fluotitanate used, elimination of the difficulty is accomplished. These limits for the quantity of the addition agent are applicable when using any of the above mentioned fluoride salts in connection with sodium or potassium fluotitanate.

The action of the fluoride salt is explained by the accompanying charts, Figs. 1 and 2. It will be seen from Fig. 1 that the pH of the mixture levels off between 7.5 and 9.5 grams per mole of fluoride added. In this connection, additive quantities above 9.5 grams per mole are not only unnecessary since they do not improve the situation, but are undesirable since they unduly contaminate the latex. On the other hand, concentrations of less than 7.5 grams per mole are insufficient to bring the pH of the latex mixture within the desired range. We have found that the pH drops off with time as noted in Fig. 2 and thus additions of less than 7.5 grams of the fluoride salt per mole fall in that portion of the curve which drops off rapidly with time, thereby causing a changing pH before the gelation occurs, due to the delayed coagulant. For these reasons, it is quite apparent from the charts that the optimum addition for any of the fluorides mentioned is an addition of between 7.5 and 9.5 grams thereof per mole of fluotitanate used.

It is understood that the latex is compounded prior to use and in the case of foam is compounded prior to or during foaming with any of the usual compounding ingredients including vulcanizing agents, accelerators, pigments, fillers, modifiers, etc., wherein the mixture of the delayed coagulant and the soluble fluoride salt is added and mixed preferably after compounding the latex and in the case of foaming, after foaming, and just prior to spraying, dipping or molding operations.

Some specific recipes of compounded latex which have produced satisfactory results are as follows: (Percentages following latex additions indicate percentage solids)

Recipe #1

| | |
|---|---|
| Anode natural latex (60%) | 350. |
| Lotol 5010-C (56%) | 150. |
| Master #35 | 57. |
| Na₂TiF₆ with NaF (50% susp.) | 10 cc. |
| Gel time | 7¼ min. |

Recipe #2

| | |
|---|---|
| Anode natural latex (60%) | 350. |
| Lotol 5010-C (56%) | 150. |
| Master #35 | 57. |
| Na₂TiF₆ with NaF (50% susp.) | 10 cc. |
| Gel time | 8 min. |

Recipe #3

| | |
|---|---|
| Anode natural latex (60%) | 70. |
| Lotol 5010-C (56%) | 30. |
| Master #35 | 11.4. |
| Na₂TiF₆ with NaF (powder) | 1. |
| Gel time | 4¼ min. |

Recipe #4

| | |
|---|---|
| Anode natural latex (60%) | 70. |
| Lotol 5010-C (56%) | 30. |
| Master #35 | 11.4. |
| Na₂TiF₆ with NaF (powder) | 1. |
| Gel time | 4¾ min. |

In recipes #1 and #2, the fluoride was mixed with the fluotitanate in a 50% water suspension and added on a volumetric basis as noted whereas in Recipes #3 and #4, the fluotitanate and the fluoride were mixed in dry powder form and then this dry powder was stirred into the latex for about two minutes. The gel times for each of the four recipes is noted in connection with the recipes. In all recipes the quantities are noted in parts by weight except where fluotitanate additions are specifically mentioned and in Recipe #1, the gelling agent suspension was made up to include 7.5 grams of sodium fluoride for each 207.89 grams of sodium fluotitanate which was subsequently made into a 50% suspension. In Recipe #2, 9.5 grams of sodium fluoride was used for each 207.89 grams of sodium fluotitanate which was then made into a 50% suspension. Thus it will be noted that in these two recipes, the extremes of the range noted herein were used, namely, from 7.5 to 9.5 grams per mole. The same proportions were used in connection with Recipes #3 and #4 wherein in Recipe #3, 7.5 grams of sodium fluoride were used per mole of sodium fluotitanate, whereas in Recipe #4, 9.5 grams of sodium fluoride were used per mole of sodium fluotitanate.

Master #35 indicated as one of the ingredients in each of the four recipes contains the following ingredients in parts by weight except with respect to the volumetric additions as noted:

Recipe #5

| | |
|---|---|
| Zinc oxide | 720 |
| Sulfur | 300 |
| Zenite special | 150 |
| Accel. #552 | 90 |
| Ethyl zimate | 60 |
| Agerite white | 90 |
| Casein soln. 10% ammon cc | 525 |
| Darvan #1 soln. (10%) cc | 358 |

These ingredients were ball-milled together for 24 hours prior to use.

While the embodiments of the present invention as herein disclosed, constitute preferred forms, it is to be understood that other forms might be adopted.

What is claimed is as follows:

1. In a method of producing articles from latex selected from a group consisting of natural rubber latex, aqueous dispersions of rubbery polymers of butadiene containing hydrocarbons and aqueous dispersions of polychloroprene, including a delayed coagulant which is selected from the class consisting of sodium and potassium fluotitanate, that step of increasing the fluoride anion concentration in the latex by the addition of a soluble alkali fluoride selected from the class of fluorides consisting of sodium, potassium and ammonium fluoride in quantities of between 7.5 grams and 9.5 grams per mole of fluotitanate used, said addition being mixed with the delayed coagulant prior to its addition to the latex.

2. A new composition of matter comprising, latex selected from a group consisting of natural rubber latex, aqueous dispersions of rubbery polymers of butadiene containing hydrocarbons and aqueous dispersions of polychloroprene, including a delayed coagulant, selected from the class consisting of sodium and potassium fluotitanate, and an addition agent for preventing local coagulation of the latex consisting of a fluoride salt taken from the class consisting of sodium, potassium and ammonium fluoride wherein the quantity of the fluoride salt ranges from 7.5 grams to 9.5 grams per mole of the fluotitanate salt used, said fluoride salt being mixed with the fluotitanate.

3. In a method of producing articles from latex selected from a group consisting of natural rubber latex, aqueous dispersions of rubbery polymers of butadiene containing hydrocarbons and aqueous dispersions of polychloroprene, including a delayed coagulant which is selected from the class consisting of sodium and potassium fluotitanate that step of increasing the fluoride anion concentration in the latex by the addition of sodium fluoride in quantities of from 7.5 to 9.5 grams per mole of the fluotitanate used, wherein the sodium fluoride is mixed with the fluotitanate.

4. In a method of producing articles from latex selected from a group consisting of natural rubber latex, aqueous dispersions of rubbery polymers of butadiene containing hydrocarbons and aqueous dispersions of polychloroprene, including a delayed coagulant which is selected from the class consisting of sodium and potassium fluotitanate, that step of increasing the fluoride anion concentration in the latex by the addition of potassium fluoride in quantities of from 7.5 to 9.5 grams per mole of the fluotitanate used, wherein the potassium fluoride is mixed with the fluotitanate.

5. In a method of producing articles from latex selected from a group consisting of natural rubber latex, aqueous dispersions of rubbery polymers of butadiene containing hydrocarbons and aqueous dispersions of polychloroprene, including a delayed coagulant which is selected from the class consisting of sodium and potassium fluotitanate, that step of increasing the fluoride anion concentration in the latex by the addition of ammonium fluoride, in quantities of from 7.5 to 9.5 grams per mole of the fluotitanate used, wherein the ammonium fluoride is mixed with the fluotitanate.

6. A new composition of matter comprising, latex selected from a group consisting of natural rubber latex, aqueous dispersions of rubbery polymers of butadiene containing hydrocarbons and aqueous dispersions of polychloroprene, including a delayed coagulant, selected from the class consisting of sodium and potassium fluotitanate and sodium fluoride as an addition agent for preventing local coagulation of the latex in quantities ranging from 7.5 to 9.5 grams per mole of the fluotitanate salt used, wherein the sodium fluoride is mixed with the fluotitanate salt.

7. A new composition of matter comprising, latex selected from a group consisting of natural rubber latex, aqueous dispersions of rubbery polymers of butadiene containing hydrocarbons and aqueous dispersions of polychloroprene, including a delayed coagulant selected from the class consisting of sodium and potassium fluotitanate, and potassium fluoride as an addition agent for preventing local coagulation of the latex in quantities ranging from 7.5 to 9.5 grams per mole of the fluotitanate salt used wherein the potassium fluoride is mixed with the fluotitanate salt.

8. A new composition of matter comprising, latex selected from a group consisting of natural rubber latex, aqueous dispersions of rubbery polymers of butadiene containing hydrocarbons and aqueous dispersions of polychloroprene, including a delayed coagulant selected from the class consisting of sodium and potassium fluotitanate, and ammonium fluoride as an addition agent for preventing local coagulation of the latex in quantities ranging from 7.5 to 9.5 grams per mole of the fluotitanate salt used wherein the ammonium fluoride is mixed with the fluotitanate salt.

9. In a method of producing articles from foamed latex selected from a group consisting of natural rubber latex, aqueous dispersions of rubbery polymers of butadiene containing hydrocarbons and aqueous dispersions of polychloroprene, wherein a delayed coagulant selected from the class consisting of sodium and potassium fluotitanate is used, that step of increasing the fluoride anion concentration in the latex foam by the addition of a soluble alkali fluoride selected from the class of fluorides consisting of sodium, potassium and ammonium fluoride in quantities of between 7.5 grams and 9.5 grams per mole of fluotitanate used, said addition being mixed with the delayed coagulant prior to its addition to the latex.

10. A new article of manufacture comprising foamed latex selected from a group consisting of natural rubber latex, aqueous dispersions of rubbery polymers of butadiene containing hydrocarbons and aqueous dispersions of polychloroprene, said latex foam having included therein a mixture of a delayed coagulant selected from the class consisting of sodium and potassium fluotitanate, and an addition agent for increasing the fluoride anion concentration for preventing local coagulation of the latex foam, said addition agent consisting of a fluoride salt taken from the class of sodium, potassium and ammonium fluoride wherein the fluoride salt ranges from 7.5 to 9.5 grams per mole of the fluotitanate salt used wherein the fluoride salt is mixed with the fluotitanate.

References Cited in the file of this patent

UNITED STATES PATENTS

| | | |
|---|---|---|
| 2,343,541 | Ewart | Mar. 7, 1944 |
| 2,472,054 | McFadden | May 31, 1949 |

FOREIGN PATENTS

| | | |
|---|---|---|
| 237,615 | Great Britain | Dec. 31, 1925 |
| 614,784 | Germany | June 18, 1933 |

OTHER REFERENCES

Mellor: "A Comprehensive Treatise on Inorganic and Theoretical Chemistry," vol. VII, Longmans Green & Co. (1927), page 70.

Ginsberg et al.: Z. Anorg. u. Allg. Chem., vol. 201 (1931), pages 192, 196, 197, 202 and 206.